May 11, 1926.

T. DECKER

MEASURING GRAIN DEVICE

Filed May 6, 1925 3 Sheets-Sheet 2

1,584,571

Thomas Decker INVENTOR

BY Victor J. Evans

ATTORNEY

May 11, 1926.

T. DECKER

MEASURING GRAIN DEVICE

Filed May 6, 1925      3 Sheets-Sheet 3

1,584,571

Thomas Decker INVENTOR

BY Victor J. Evans

ATTORNEY

Patented May 11, 1926.

1,584,571

UNITED STATES PATENT OFFICE.

THOMAS DECKER, OF CHATTANOOGA, OKLAHOMA.

MEASURING GRAIN DEVICE.

Application filed May 6, 1925. Serial No. 28,460.

An object of my present invention is the provision of a device for automatically measuring and delivering grain from a threshing machine as well as for weighing such grain.

A further object is the provision in a device for this purpose of a swingable grain receiving hopper, divided by flexible plates into two compartments, the said hopper having its compartments provided with doors hinged in such a manner that one of the doors is automatically closed when grain is to be delivered into the compartment and the other door likewise automatically opened when the hopper is swung by the weight of the grain therein to deliver the grain from the first mentioned compartment and to bring the second mentioned compartment into grain receiving position.

A further object is the construction, in a device for this purpose of a frame which is pivotally supported from a scale beam and which has pivotally secured thereto the lower end of a hopper which is divided, by flexible partitions into two compartments provided with doors which automatically close when either of the hoppers is in grain receiving position and to open when in grain delivering position, means being provided for locking the hopper to the frame when one of the compartments thereof is in grain receiving position, said means being releasable upon the downward movement of the frame when the weight on the scale beams is counter-balanced, and whereby the hopper is continuously oscillated to bring its respective hoppers into grain receiving and into grain delivering positions, and also wherein means is provided for limiting the swinging of the hopper to its said two positions.

A still further object is the provision, in an automatic grain measuring and weighing apparatus, of a reciprocatory hopper having flexible partitions therein dividing the same into two compartments, and doors for automatically closing one of the compartments when in grain receiving position and to open the door of the other compartment which is in grain delivering position, the partition being provided with an adjustable wiper board to prevent the entrance of grain from one into the other compartment, while means is provided for expanding or contracting the flexible partitions to permit of the enlargement of the compartments when the grain in the compartments is weighed, or when wet, and consequently heavier grain is delivered into the compartments.

With the above broadly stated objects in view and many others which will present themselves as the nature of the invention is better understood, reference is to be had to the drawings which accompany and which form part of this application.

In the drawings:—

Figure 1:
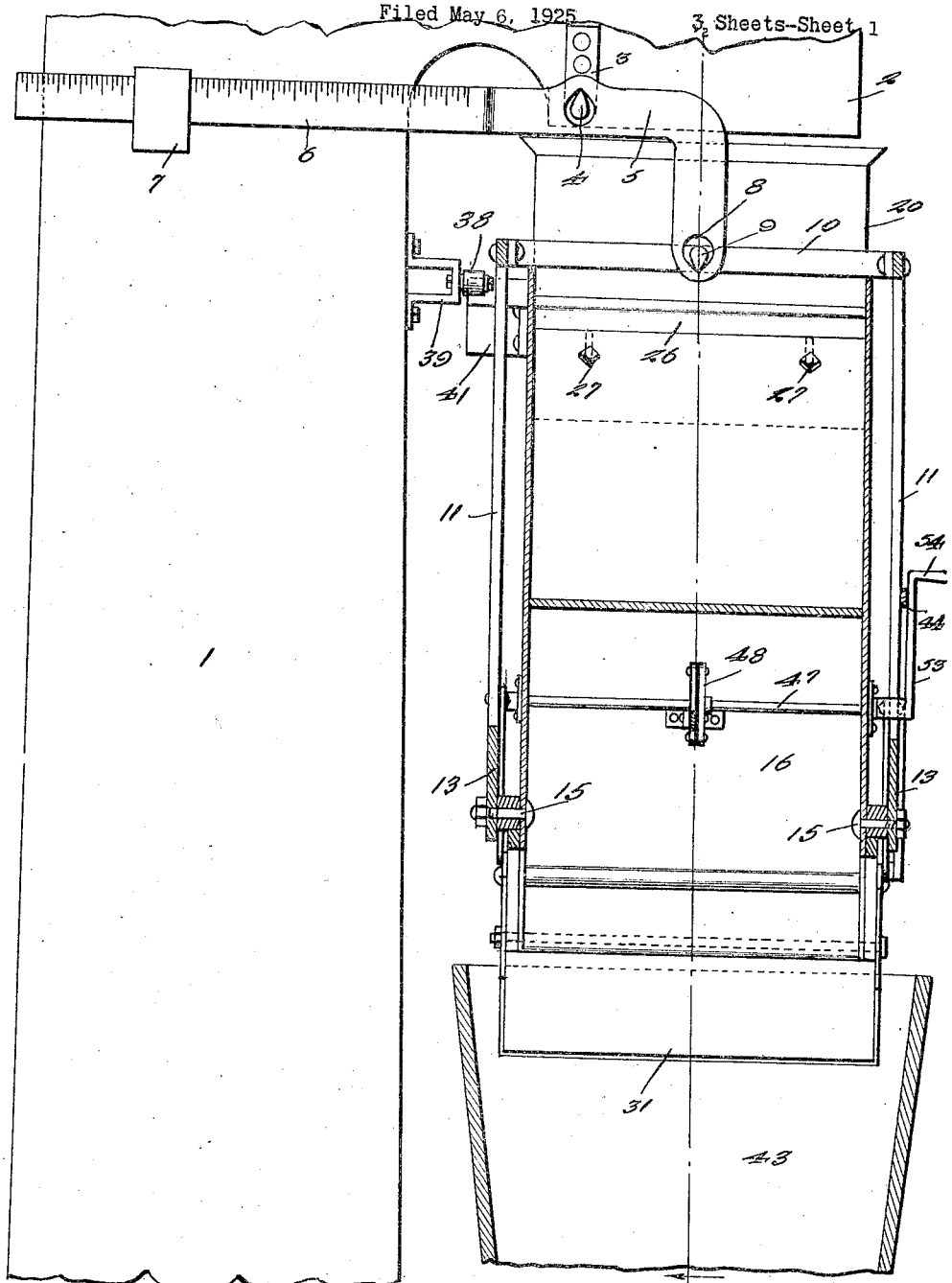
Figure 1 is a side elevation of a portion of a threshing machine provided with the improvement, the latter being in section, the said section being taken approximately on the line 1—1 of Figure 2.

In Figure 1 of the drawings, the numeral 1 designates a portion of the elevator of a threshing machine, the same being formed with an angularly disposed downwardly directed outlet spout end 2. On the sides of the spout 2 I secure brackets 3 having outwardly directed wedge-shaped pivots 4 that are received in wedge-shaped openings in the side member 5 of a scale beam 6. On the beam 6 there is a slidable weight 7. The sides 5 of the scale beam terminate in downwardly directed ends each provided with a wedge-shaped opening 8 that receive therethrough wedge-shaped studs 9 on the upper members 10 of a frame. The side members 11 of the frame are rounded outwardly and downwardly and inwardly from the members 10, as indicated by the numeral 12. The arched arms of the heart-shaped sides merge into depending plates 13, which are connected together by a transverse brace 14. The plates 13 carry bearings for the shaft 15 of a hopper 16, that constitutes an important element of the improvement. By reference to Figure 2 it will be noted that the hopper 16 is of inverted bowl-shape and that its upper end is provided with a somewhat reduced opening 17, the ends of the hopper being directed angularly to the said opening or mouth 17, as indicated by the numeral 18. The angle ends of the mouth 17 are beaded, as at 19.

Directly below the outlet 2 of the elevator of the threshing machine there is fixed in the upper part of the frame the outlet end of a spout 20. The spout has its mouth flared outwardly and its sides at its lower end flanged inwardly, as at 21. These flanges 21 are in the path of contact with the flanges 18 at the mouth of the hopper 16 so that the hopper contacting therewith will be limited in swinging on its pivot shaft in two directions.

Figure 4:
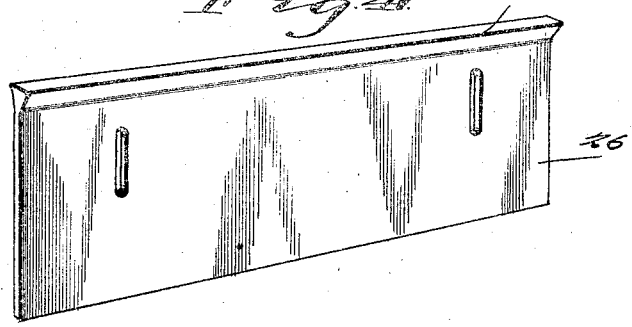
Figure 4 is a perspective view of the adjustable wiper or cut-off board.

The hopper 16 is divided by flexible partitions 22 and 23 into compartments 24 and 25. The partitions are preferably in the nature of comparatively thin metal plates and frictionally engage with the inner side walls of the hopper. Between the partitions at the upper ends thereof there is secured a board 26, illustrated in detail in Figure 4. The board is provided with spaced elongated slots through which binding elements 27 pass. The board 26 has its upper end formed with a head 28 and the sides of the said head are beveled. The head 28 is disposed slightly out of contact with the concaved walls 29 provided by the lower edges of the sides of the spout 20.

The compartments 24 and 25 have their lower and outlet ends closed by pivotally connected flanged doors 30 and 31, respectively. The doors at their outer pivoted ends 32 and 33, respectively, have angularly extending arms 34 and 35, respectively. These arms are pivotally connected to links 36 and 37, respectively, which are likewise pivoted to the lower arms of the frame.

Figure 2:
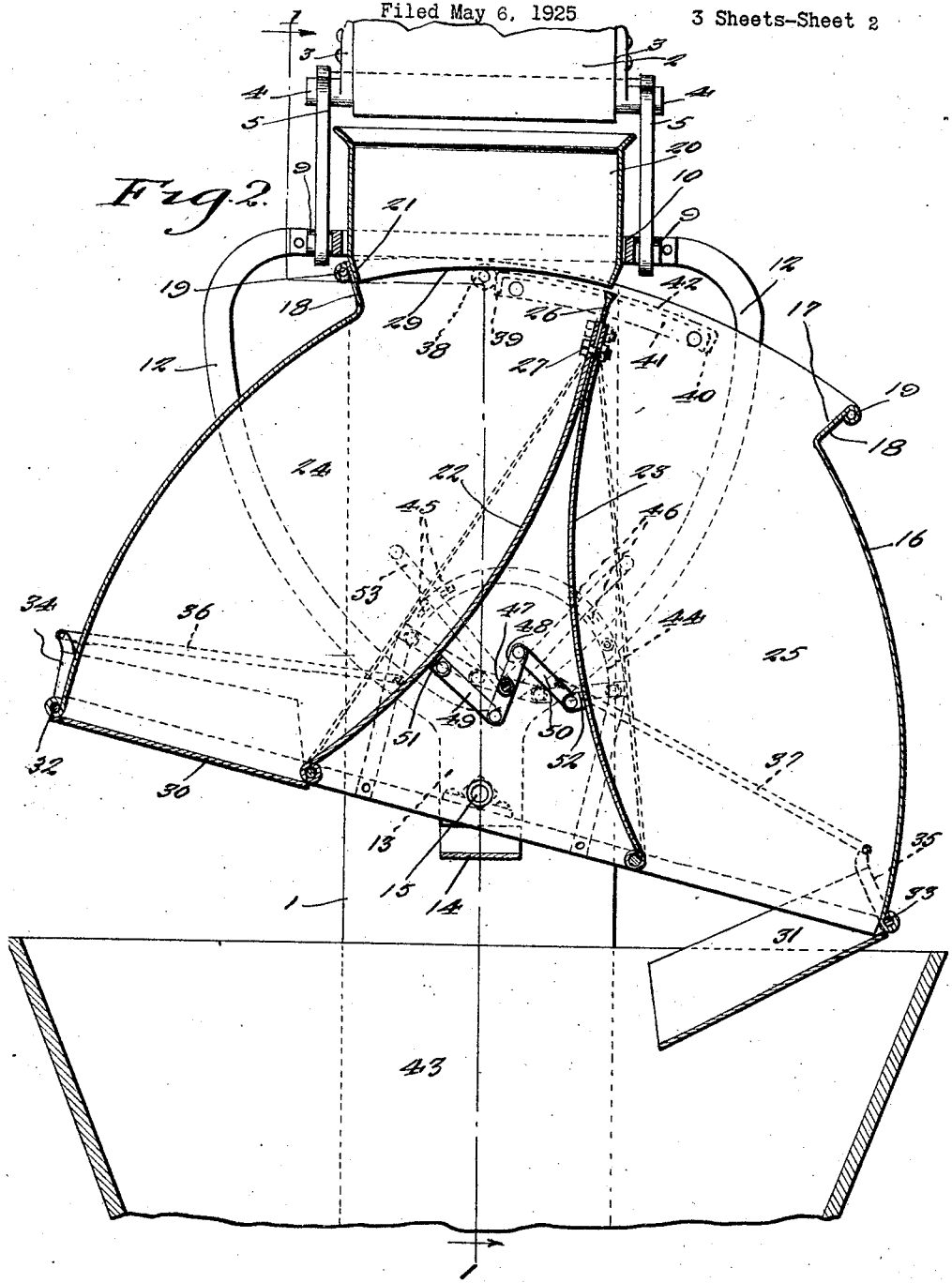
Figure 2 is an enlarged sectional view on the line 2—2 of Figure 1.
Figure 3:
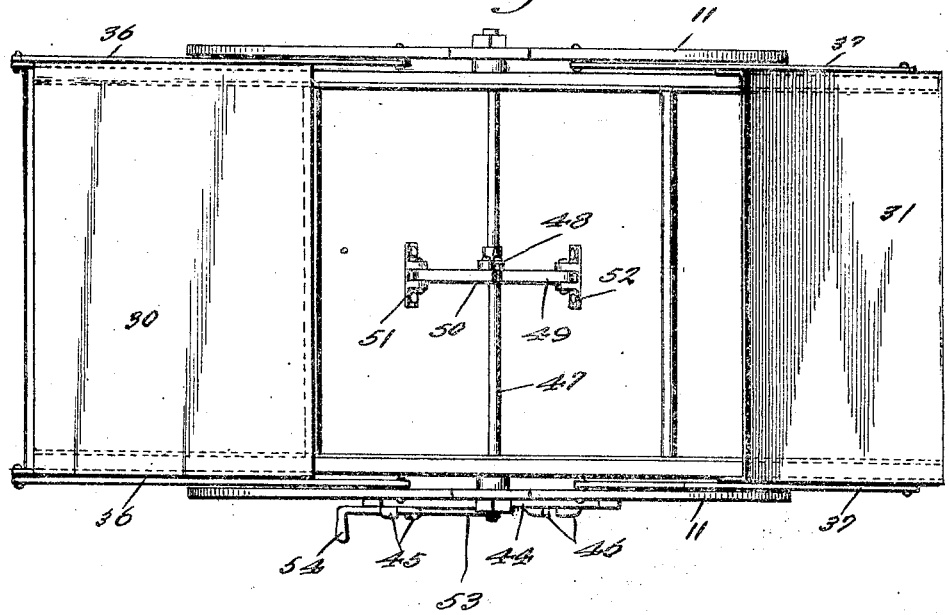
Figure 3 is a top plan view of the improvement.

As far as the description has gone, it will be noted that when the hopper 16 is swung to the position illustrated in Figure 2, the compartment 24 is in a position to receive the grain from the spout 20 and that the door 30 for the said compartment 34 is automatically moved to closed position. The board 26 has its head 28 disposed in a line with one of the angle sides 21 of the spout 20. This brings the compartment 25 to grain delivering position and the door 31 therefor is automatically swung to open position. Each of the compartments is of a size to hold a determined quantity of grain and such quantity will be delivered into the compartment 24 of the hopper. The grain in the said compartment, however, cannot be delivered therefrom as long as the door 30 is held in closed position, but it will be obvious that the weight of the grain in the said compartment is sufficient to impart a swinging movement to the hopper 16 to bring the compartment 24 into grain delivery position and the compartment 25 into grain receiving position. The means for holding the hopper from movement when either of the compartments therein is filled, comprises a roller 38 which is journaled on a suitable bracket 39 on one side the elevator casing 1. This roller is in the path of contact with either of the angle ends 39 or 40 on an arcuate rail 41 secured on one side of the hopper. The angle ends of the rail are arranged equidistant from the center of the mouth 17 of the hopper 16. When the weight of the grain in the compartment 24 overbalances the scale beam 6, the bifurcated end thereof will swing downwardly, permitting the frame, which carries the hopper, to move in the said direction. This brings the stop flange 39 of the rail 41 below the roller. The weight of the grain will cause the swinging of the hopper on its pivot shaft 15 and will cause the door 30 to automatically open as previously described so that the grain from the compartment 24 will be delivered into a wagon or other receptacle 43. The swinging of the hopper causes the curved rail 41 to ride under the roller 38 until the shouldered stop end 40 of the said rail 41 passes beyond the roller. The weighted scale beam will now raise the frame and the hopper, bringing the compartment 25 into grain receiving position. As previously stated, the swinging of the hopper, incident to the connected elements 35 and 36 will swing the door 31 to closed position. The doors open inwardly and being flanges serve as chutes in directing the grain into the receptacle 43.

On one side, at the lower portion of the hopper 16, there is secured a quadrant 44 having pairs of spaced detents 45—45 and 46—46 thereon. Journaled in suitable bearings at the sides of the hopper between the partitions 22 and 23 there is a shaft 47. Centrally fixed on this shaft there is an arm 48. Pivoted to the ends of the arm there are links 49 and 50 respectively. These links have their free ends pivoted to brackets 51 and 52, respectively, on the confronting faces of the partitions 23 and 24. Fixed on the shaft 47 there is a lever 53 having a handle end 54. The lever is laterally movable so that the same may be received between the detents 45—46 on the quadrant 44. When swung between the detents 45, as disclosed in Figure 2 of the drawings, the links 49 and 50 will draw the flexible partitions 22 and 23 toward each other to arch the same. This enlarges the compartments 24 and 25 which is desirable when large quantities of grain or when wet grain is to be weighed. By swinging the lever between the detents 46, the links 49 and 50 will expand the partitions, bringing the same to the position illustrated by the dotted lines in Figure 2 of the drawings, thus reducing the size of the compartments.

The simplicity and advantages of my construction will, it is believed, be apparent from the foregoing description when taken in connection with the drawings, by those skilled in the art to which such inventions relate. It is, of course, to be understood that I do not wish to be limited to size, proportion, material employed, nor to the details of construction herein set forth and that I may make such changes therefrom as fairly fall within the scope of what I claim.

Having described the invention, I claim:—

1. In a device for the purpose set forth, a counter-balanced frame, a spout associated therewith, a hopper pivotally secured to the lower portion of the frame and having the end walls of its mouth contactable with the spout for limiting the swinging of the hopper, said hopper being divided into two compartments, a swingable door closing each of the compartments, means for locking the hopper on the frame to arrange one of its compartments in grain receiving position, and means for delivering grain into the hopper, means between the grain receiving door and the frame for opening the latter when the frame is moved downwardly by the weight of the grain in the said compartment and to release the holding means to permit of the swinging of the hopper to bring its second compartment into grain receiving position, and means between the door of the second compartment and the frame for closing and locking said door when its compartment is in grain receiving position.

2. In a device for the purpose set forth, a pivotally supported weight influenced frame, a spout carried thereby, a hopper centrally pivoted to the lower portion of the frame, yieldable partitions in the hopper dividing the same into two compartments, a door for closing the outlet of each compartment and said hopper being limited in its swinging movement by the contacting engagement of the ends of the mouth thereof with the outlet mouth of the spout, means holding the hopper on the frame for retaining one of its compartments in grain receiving position, and means for delivering grain into said compartment, means between the door of the grain receiving compartment and the frame for closing and locking said door, means actuated by the downward movement of the hopper and frame incident to the weight of the grain in one of the compartments for releasing the door of the grain receiving compartment and by virtue of the weight of the grain in said compartment to swing the hopper to bring its second compartment into grain receiving position, means incident to the upward movement of the counter-balanced frame and hopper for holding the second compartment in grain receiving position, and means between the frame and the door of the said compartment for swinging and retaining the said door in closed position.

3. In a device for the purpose set forth, a pivotally supported weight influenced frame, and in which the weight therefor is adjustable, a spout carried by the frame, a hopper having its lower portion centrally pivoted to the frame, said hopper being divided into two compartments, an adjustable board arranged centrally between the compartments and having a headed end engageable with the lower edge of the spout, an arcuate member at the mouth of the spout, a roller with which one end of the arcuate member is contactable for holding the hopper to position one of its compartments to receive grain from the spout, and means for delivering grain into the spout, doors closing the outlet of both compartments, pivotally supported means on the frame for holding the door of the grain receiving compartment in open position and for likewise holding the door of the second compartment in open position, and said means designed to release the first mentioned door when the weight of the grain in the compartment therefor overbalances the frame and hopper to permit of the downward movement of the said frame and hopper to bring the segmental member out of engagement with the roller to permit of the swinging of the hopper incident to the weight of the grain therein to bring its second compartment to grain receiving position, to close the door of the last mentioned compartment and to likewise bring the second end of the segmental member into engagement with the roller.

4. In a device for the purpose set forth, a pivotally supported scale beam having an adjustable weight thereon, a frame to which the beam is pivotally connected, a hopper having its sides pivotally secured to the lower portion of the frame, flexible division boards in the hopper dividing the same into two compartments, a pivotally supported door having an angle inner end for closing each of the compartments, a link connection between the ends of the doors and the frame, a segmental member on the upper end of the hopper, a roller with which the ends of the said segmental member are engageable whereby to hold one of the compartments in grain receiving position, and means for delivering grain into said compartment and the door of the compartment, incident to its link connection with the frame designed to be swung to closed position, while the door of the second compartment designed, by the link connected thereto to be swung to open position, means operable exteriorly of the hopper and connected to the confronting faces of the flexible partitions for bulging the same inwardly or for holding the same in straight positions, and an adjustable wiper board between the partitions, all as and for the purpose set forth.

In testimony whereof I affix my signature.

THOMAS DECKER.